(No Model.)
P. E. HECK.
Gate.
No. 232,181. Patented Sept. 14, 1880.
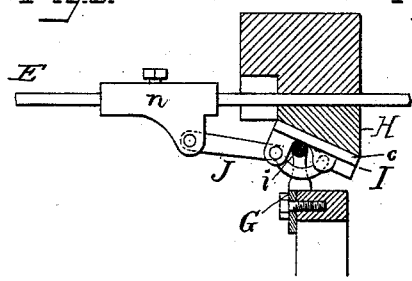
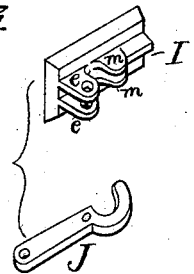
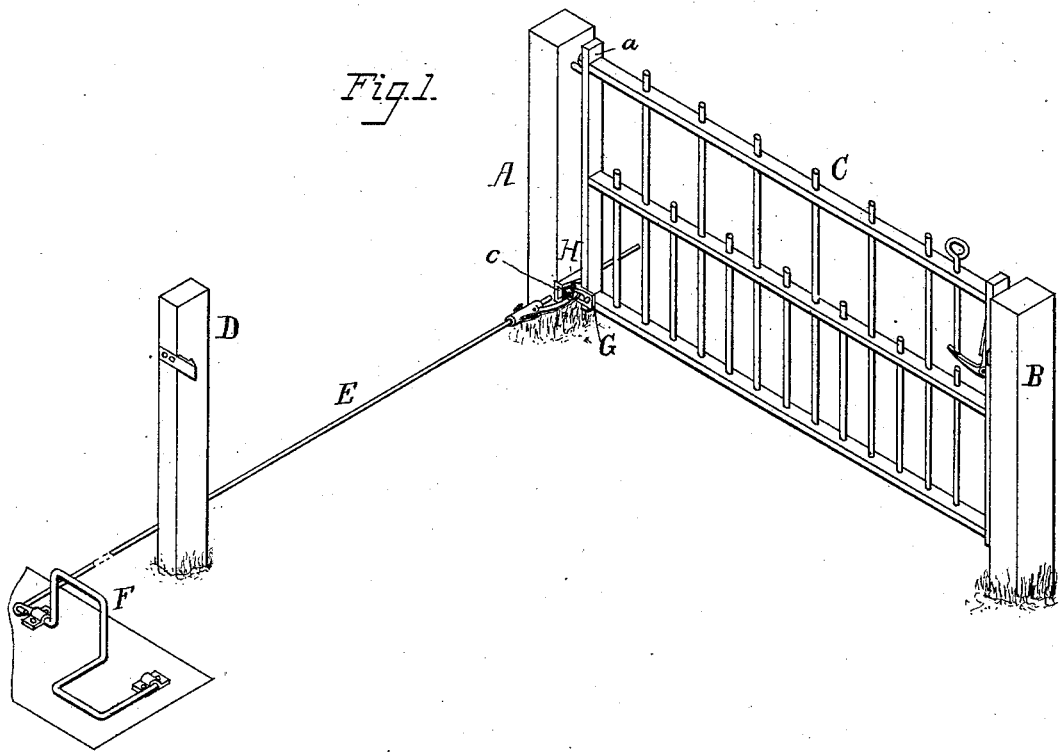
Attest:
Courtney A. Cooper
Jas. L. Ewin
P. E. Heck
By his attorney
Charles E. Foster

UNITED STATES PATENT OFFICE.

PETER E. HECK, OF CONNERSVILLE, INDIANA.

GATE.

SPECIFICATION forming part of Letters Patent No. 232,181, dated September 14, 1880.

Application filed April 2, 1880. (No model.)

*To all whom it may concern:*

Be it known that I, PETER E. HECK, of Connersville, Fayette county, Indiana, have invented an Improvement in Gates, of which the following is a specification.

My invention relates to that class of gates in which the lower hinge is adjusted to tilt the gate so as to open and close the same; and it consists in constructing the parts, as fully described hereinafter, so as to reduce the expense of making the hinge and facilitate attachment and operation with gates swinging in either direction.

In the drawings, Figure 1 is a perspective view, showing a gate with my improvements; Fig. 2, a transverse section enlarged of the lower hinge and operating appliances; Fig. 3, detached perspective views of parts.

The posts A B, gate C, and upper hinge, $a$, as well as the secondary post D, are constructed and arranged as usual in this class of gates, and the rod E is connected on opposite sides with cranks F, arranged to move the rod longitudinally when a vehicle turns the cranks in the ordinary manner.

To the inner standard of the gate is bolted a bracket, G, supporting an upright pintle or pin, $i$, and to the post A is bolted a bracket, H, having a face inclined or beveled to the face of the post, with a dovetailed groove, $c$, within which slides the dovetailed carrier I. Between lugs $e\ e$ of this carrier is pivoted a lever or arm, J, having a hook end, which encircles the pintle $i$ and extends between parallel lips $m$ $m$ on the carrier, so as to prevent the pintle from slipping out of the hook, which thus holds the pintle to the carrier, while all the bearing is upon the upper pintle, thereby reducing friction and facilitating the operation of the gate.

The lever J is pivoted to a sleeve, $n$, secured adjustably on the rod E, which passes directly through and is guided by the post A, instead of being in two pieces connected to the pintle $i$, as in the gate patented to me on the 28th day of October, 1879. This reduces the cost of fitting, while by slightly adjusting the sleeve $n$ the parts may be brought into proper relative position without cutting the operating-rod.

Should it be necessary to unhang the gate, the lever J is disconnected from the sleeve $n$, when it can be turned to bring the hooked end from between the lips $m\ m$ and release the pintle. The gate may be rehung with like facility.

It will be obvious that, instead of the lips $m$, a hole may be made in the carrier for the hooked end of the lever J.

The operation of the improvement is readily understood. When the crank F is depressed by the wheel of a vehicle, motion is imparted to the rod E and to the sleeve $n$, secured thereto, which forces forward lever J, which, in turn, slides the carrier I forward in the groove $c$, thus forcing the hinged end of the gate out of its vertical position and causing the gate to swing back against the post D. The reverse movement closes the gate.

The above parts may be reversed to connect to a gate swinging in the opposite direction from that shown.

I claim—

1. The combination of the bracket G and its pintle, the bracket H, having a dovetailed groove, $c$, the carrier I, sliding in said groove, and the lever J, pivoted to said carrier and provided with a hooked end for securing the pintle, substantially as set forth.

2. The combination of the rod E, sliding through the post A, the carrier I, connected to the lower pintle, and an arm, J, and sleeve $n$, connecting the carrier to the rod, substantially as set forth.

In testimony whereof I have signed my name to this specification in the presence of two subscribing witnesses.

PETER EMERY HECK.

Witnesses:
L. W. FLOREA,
JOHN T. MANLOVE.